US007079104B2

(12) United States Patent
Kumagai et al.

(10) Patent No.: US 7,079,104 B2
(45) Date of Patent: Jul. 18, 2006

(54) SEMICONDUCTOR DEVICE AND LIQUID CRYSTAL PANEL DISPLAY DRIVER

(75) Inventors: Masao Kumagai, Kawasaki (JP); Shinya Udo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 146 days.

(21) Appl. No.: 10/219,301

(22) Filed: Aug. 16, 2002

(65) Prior Publication Data

US 2003/0103028 A1 Jun. 5, 2003

(30) Foreign Application Priority Data

Nov. 30, 2001 (JP) ............................ 2001-366044

(51) Int. Cl.
*G09G 3/36* (2006.01)
*G06F 17/50* (2006.01)

(52) U.S. Cl. .......................... 345/98; 345/213; 716/18

(58) Field of Classification Search .................. 345/87, 345/92, 98–100, 103, 211–214; 716/18
See application file for complete search history.

(56) References Cited

U.S. PATENT DOCUMENTS

| | | | | |
|---|---|---|---|---|
| 6,456,271 | B1 * | 9/2002 | Tamai et al. | 345/100 |
| 6,697,040 | B1 * | 2/2004 | Imajo et al. | 345/98 |
| 2001/0048415 | A1 * | 12/2001 | Morii | 345/87 |
| 2004/0046727 | A1 * | 3/2004 | Fujioka et al. | 345/98 |

* cited by examiner

*Primary Examiner*—Henry N. Tran
(74) *Attorney, Agent, or Firm*—Arent Fox PLLC

(57) ABSTRACT

A semiconductor device that operates with reduced power consumption having a clock transfer blocking circuit and an external data transfer blocking circuit that blocks a clock signal and a data signal from being transferred to a data output circuit when a data signal captured by a data capturing circuit is to be latched by a latch circuit. If however, the data signal captured is necessary for a later stage of the semiconductor device, then an internal data transfer blocking circuit blocks the data signal from being latched in the latch circuit, while the clock transfer blocking circuit and the external data transfer blocking circuit cause the captured clock signal and data signal to be output to the data output circuit.

9 Claims, 6 Drawing Sheets

SEMICONDUCTOR DEVICE AND LIQUID CRYSTAL PANEL DISPLAY DRIVER

BACKGROUND OF THE INVENTION

1. Field of the Invention

The present invention relates to semiconductor devices, and more particularly, to a semiconductor device suitably applicable to an integrated circuit for driving a thin-model display device such as a liquid crystal panel or a plasma display panel.

A gate driver and a source or data driver are known as integrated circuits for driving a liquid crystal display panel in which liquid crystal and a TFT (Thin Film Transistor) are combined. The gate driver functions to selectively drive gate lines running horizontally on the display panel in an order from the top. The data driver converts a picture data signal to a voltage to be applied to liquid crystal and applies the voltage to a pixel electrode connected to a selected gate line.

The data driver has a limited number of outputs mountable on a single integrated circuit. For that reason, a plurality of integrated circuit drivers are used to realize the desired resolution of the liquid crystal display panel. For instance, eight integrated circuit drivers are needed to realize the XGA (eXtended Graphics Array) liquid crystal panel consisting of 1024×768 dots, each of the drivers having 384 outputs (128×3 in RGB), and ten drivers are needed to realize the SXGA (Super eXtended Graphics Array) consisting of 1280×1024 dots.

2. Description of the Related Art

FIG. 5 illustrates an arrangement of the conventional data driver. In the arrangement, four individual integrated circuit drivers 102 are used for single liquid crystal display panel 101. The input of each of the drivers 102 is connected to a plurality of common data lines DATA and a common clock line CLK, via which a data line and a clock signal are supplied to the integrated circuit drivers 102 in parallel. The output of each of the integrated circuit drivers 102 are connected to source lines of the liquid crystal display panel 101.

Each of the integrated circuit drivers 102 is equipped with a gate circuit in the input port via which the data signal is taken. The gate circuit analyzes the data signal applied to all the drivers 102. Then, the gate circuit opens its own gate and latches the data signal if the data signal should be taken in. After the gate latches the data signal, the gate circuit closes the gate. Thus, each of the drivers 102 is disabled while the other drivers latch the data signal. Thus, it is possible to reduce power consumed in the data driver.

The interconnections from the common data lines DATA to the respective drivers 102 have crossing points in the parallel style in which the data signal is sent in parallel. A printed-circuit board on which the drivers 102 are mounted employs through holes used to connect the data lines DATA and input lines extending to the drivers 102 formed in another layer. The above interconnection is achieved using a multilayer board having four to six layers.

Since the data lines DATA and the clock line CLK are used to drive all the drivers 102, a drive circuit connected to these lines is needed to have a high drivability. However, considerable EMI arises from the highly driven lines.

FIG. 6 shows another arrangement of the conventional data driver. The arrangement shown in FIG. 6 is the same as that shown in FIG. 5 in that the outputs of the integrated circuit drivers 103 are connected to the source lines of the liquid crystal display panel 101, but is different therefrom in that the data lines DATA and the clock line CLK are arranged so as to cascade the drivers 103.

The data signal and the clock signal that travels on the data lines DATA and the clock line CLK are sent to the drivers 103 in turn. The cascaded arrangement does not have crossing points of the data lines DATA that exist in the parallel formation. Thus, the printed-circuit board on which the driver 103 is mounted may be formed by a reduced number of layers, for example, two layers. This reduces the cost of the printed-circuit board. Further, the circuit that supplies the data signal and the clock signal to the data lines DATA and the clock line CLK is required to drive only the first driver 103, and may have a reduced drivability. This contributes to reduction in EMI resulting from the data lines DATA and the clock line CLK.

However, it should be noted that the data cascading system differs from the parallel formation in that the data signal passes inside the integrated circuit of the driver and is sent to the next stage. Therefore, the driver is required to continue to input the data signal for the next stage even after the data signal that is to be taken in its own integrated circuit is completely latched.

SUMMARY OF THE INVENTION

Taking into consideration the above, an object of the present invention is to provide a semiconductor device in which reduced power is consumed in the data cascading system.

The above object is achieved by a semiconductor device capable of capturing a necessary data signal from a data signal that travels therein. The semiconductor device comprises: a data capturing circuit receiving a clock signal and a data signal from an outside of the semiconductor device; a data output circuit sending the clock signal and the data signal captured by the data capturing circuit to the outside; a latch circuit latching the data signal captured by the data capturing circuit; and an internal data transfer blocking circuit blocking the data signal from being transferred to the latch circuit while the data capturing circuit receives the data signal that is not to be latched by the latch circuit.

Also, the above object is achieved by a liquid crystal display panel driver of a data cascading system in which a data signal is input and is cascaded to a next stage. The driver comprises: a data capturing circuit receiving a clock signal and a data signal from an outside of the semiconductor device; a data output circuit sending the clock signal and the data signal captured by the data capturing circuit to the outside; a latch circuit latching the data signal captured by the data capturing circuit; and an internal data transfer blocking circuit blocking the data signal from being transferred to the latch circuit while the data capturing circuit receives the data signal that is not to be latched by the latch circuit.

The above and other objects, features and advantages of the present invention will become more apparent from the following detailed description when taken in conjunction with the accompanying drawings which illustrate preferred embodiments of the present invention by way of example.

DESCRIPTION OF THE PREFERRED EMBODIMENTS

The outline of the present invention is now described with reference to the accompanying drawings.

Figure 1:
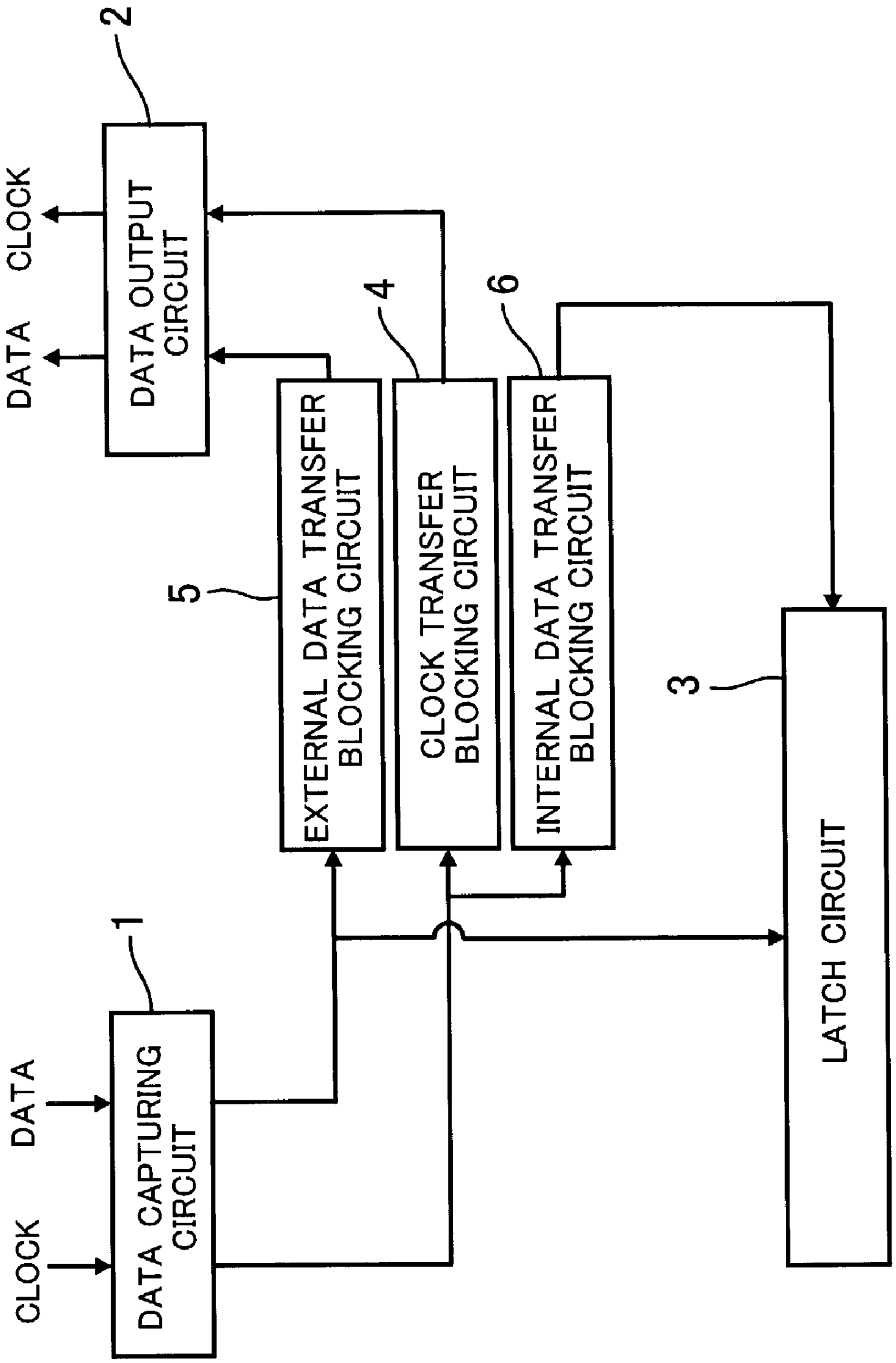
FIG. 1 is a diagram showing a principal structure of a semiconductor device of the present invention.

FIG. 1 shows a principal structure of a semiconductor device of the present invention. A plurality of semiconductor devices of the present invention are applied to a multistage circuit such that an input data signal is transferred in cascaded formation. The connections between the semiconductor devices in the data cascading system are made so that only the first stage of the semiconductor device is supplied with the data signal and the clock signal. Therefore, the first stage of the semiconductor device may have a relatively low drivability. This is advantageous to EMI.

The semiconductor device includes a data capturing circuit 1, a data output circuit 2, and a latch circuit 3. The data capturing circuit 1 captures the clock signal and the data signal from the outside of the semiconductor device. The data output circuit 2 outputs the captured clock signal and the data signal to the next stage. The latch circuit 3 latches the data signal captured by the data capturing circuit 1. Further, the semiconductor device includes a clock transfer blocking circuit 4, an external data transfer blocking circuit 5, and an internal data transfer blocking circuit 6. The clock transfer blocking circuit 4 blocks outputting of the clock signal to the data output circuit 2 while the latch circuit 3 continues to hold the captured data signal. The external data transfer blocking circuit 5 blocks outputting the data signal to the data output circuit 2 while the latch circuit 3 continues to hold the captured data signal. The internal data transfer blocking circuit 6 blocks outputting of the data signal to the latch circuit while the data signal is being output to the data output circuit 2.

In operation, the data capturing circuit 1 captured the clock signal and the data signal serially sent from the outside of the semiconductor device. If the data signal is to be latched by the latch circuit 3, the clock transfer blocking circuit 4 and the external data transfer blocking circuit 5 block outputting the clock signal and the data signal to the data output circuit 2. The internal data transfer blocking circuit 6 generates an internal clock signal from the clock signal and operates the latch circuit 3. The data capturing circuit 1 latches the data signal thus captured. The data signal thus latched is transferred to an internal circuit and processed, and is then output via the output port.

When the latch circuit 3 finishes latching of the data signal, the clock transfer blocking circuit 4 and the external data transfer blocking circuit 5 are allowed to output the clock signal and the data signal to the data output circuit 2 to the next stage. In addition, the internal data transfer blocking circuit 6 stops generating the internal clock signal. Thus, the latch circuit 3 stops operating while it is not supplied with the internal clock signal.

In the above-mentioned manner, when the data signal to be latched is supplied, the latch circuit 3 latches the data signal. During that time, the clock transfer blocking circuit 4 and the external data transfer blocking circuit 5 inhibit the clock signal and the data signal from being output to the data output circuit 2. Thus, the semiconductor device of the next stage is stopped due to stoppage in supply of the clock signal, and power consumption can be reduced. In contrast, when the data signal to be latched by any of the stages following to the first stage is supplied, the clock transfer blocking circuit 4 and the external data transfer blocking circuit 5 output the clock signal and the data signal to the data output circuit 2, while the latch circuit 3 of the first stage is stopped due to stoppage in supply of the clock signal by the internal data transfer blocking circuit 6. Thus, power consumption in the first stage of semiconductor device can be reduced.

A description will now be given of an embodiment of the present invention in which the semiconductor device is applied to the integrated circuit driver for driving the source lines of the liquid crystal display panel.

Figure 2:
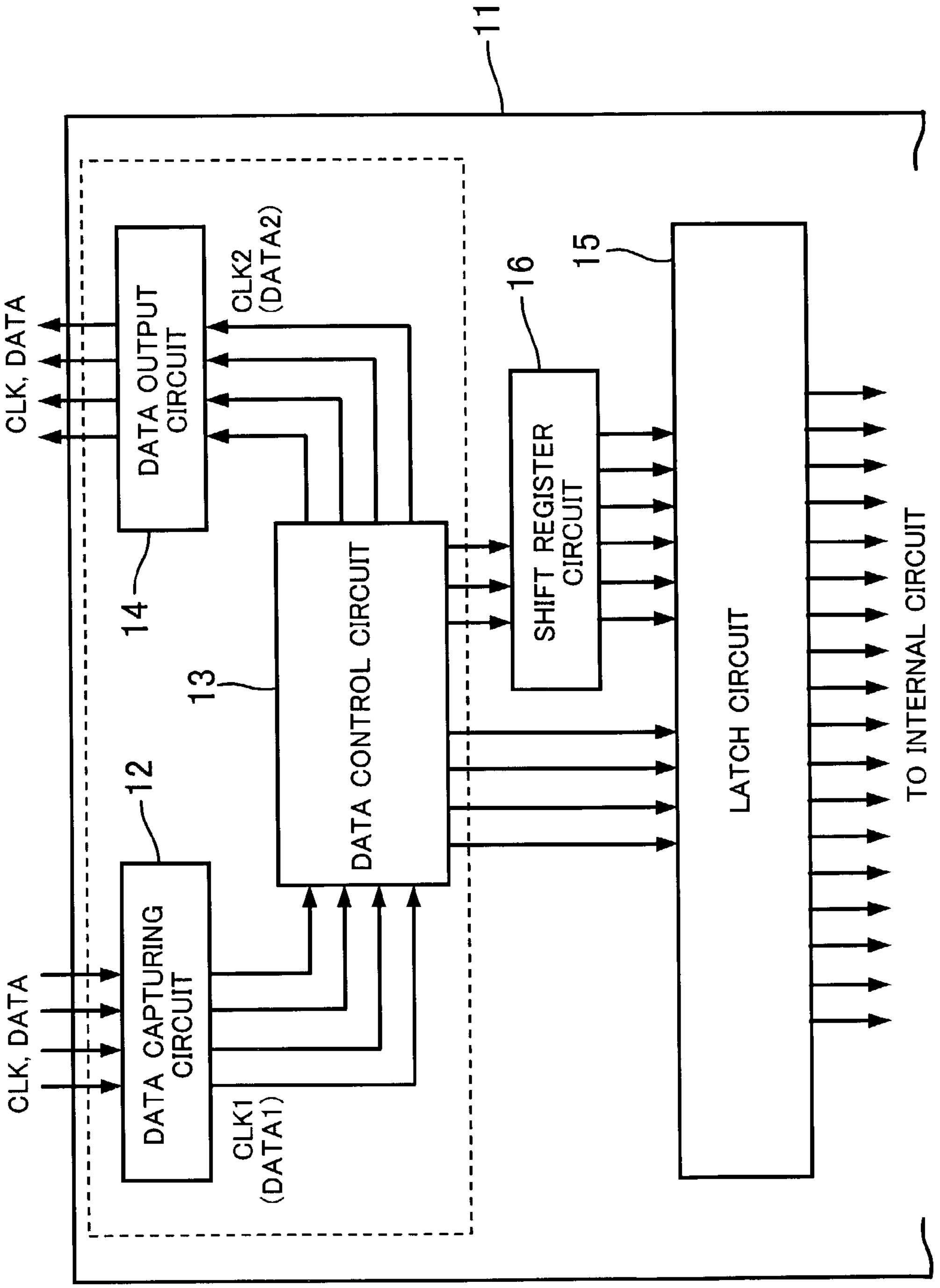
FIG. 2 is a block diagram of a schematic structure on the data input side of an integrated circuit driver.

FIG. 2 is a schematic block diagram of a structure on the data input circuit side of the integrated circuit driver.

An integrated circuit driver 11 is equipped with a data capturing circuit 12, a data control circuit 13 and a data output circuit 14. The data capturing circuit 12 captures the clock signal CLK and the data signal DATA from the outside of the driver. The data control circuit 13 processes the clock signal and the data signal captured by the data capturing circuit 12. The data output circuit 14 outputs the clock signal and the data signal processed by the data control circuit 13 to the next stage of integrated circuit driver. Further, the driver 11 is equipped with a latch circuit 15 and a shift register circuit 16. The latch circuit 15 latches the data signal from the data control circuit 13. The shift register circuit 16 controls the latch circuit 15 to sequentially latch the data signal serially supplied.

The clock signal CLK and the data signal DATA input to the driver 11 are sent to the data capturing circuit 12 and the data control circuit 13. When the data signal supplied is to be latched in the latch circuit 15, the data control circuit 13 buffers the data signal and transfers it to the latch circuit 15. At that time, the data control circuit 13 does not transfer the data signal to the data output circuit 14. After the latch circuit 15 completely latches the data signal, the data control circuit 13 stops transferring the data signal to the latch circuit 15, and controls to transfer the input clock signal and data signal to the data output circuit 14.

The data signal latched by the latch circuit 15 is sent to an internal circuit that drives the liquid crystal display panel. The internal circuit has the function of converting the input data signal to an analog output voltage, which is then to the corresponding source line of the liquid crystal display panel via an output buffer.

As described above, the data control circuit 13 separates the data signal to be sent to the latch circuit 15 from the data signal to be transferred to the driver of the next stage, so that the data unnecessary for the circuits cannot be transferred. Thus, when the driver 11 captures the data signal addressed thereto, the drivers located at the following stages stop operating. In contrast, when the data is addressed to any of the following stages, the latch circuit 15 of the driver 11 of interest stops operating. Thus, the clock signal and the data signal are not supplied to the unnecessary circuits, so that power consumption can be reduced.

Figure 3:
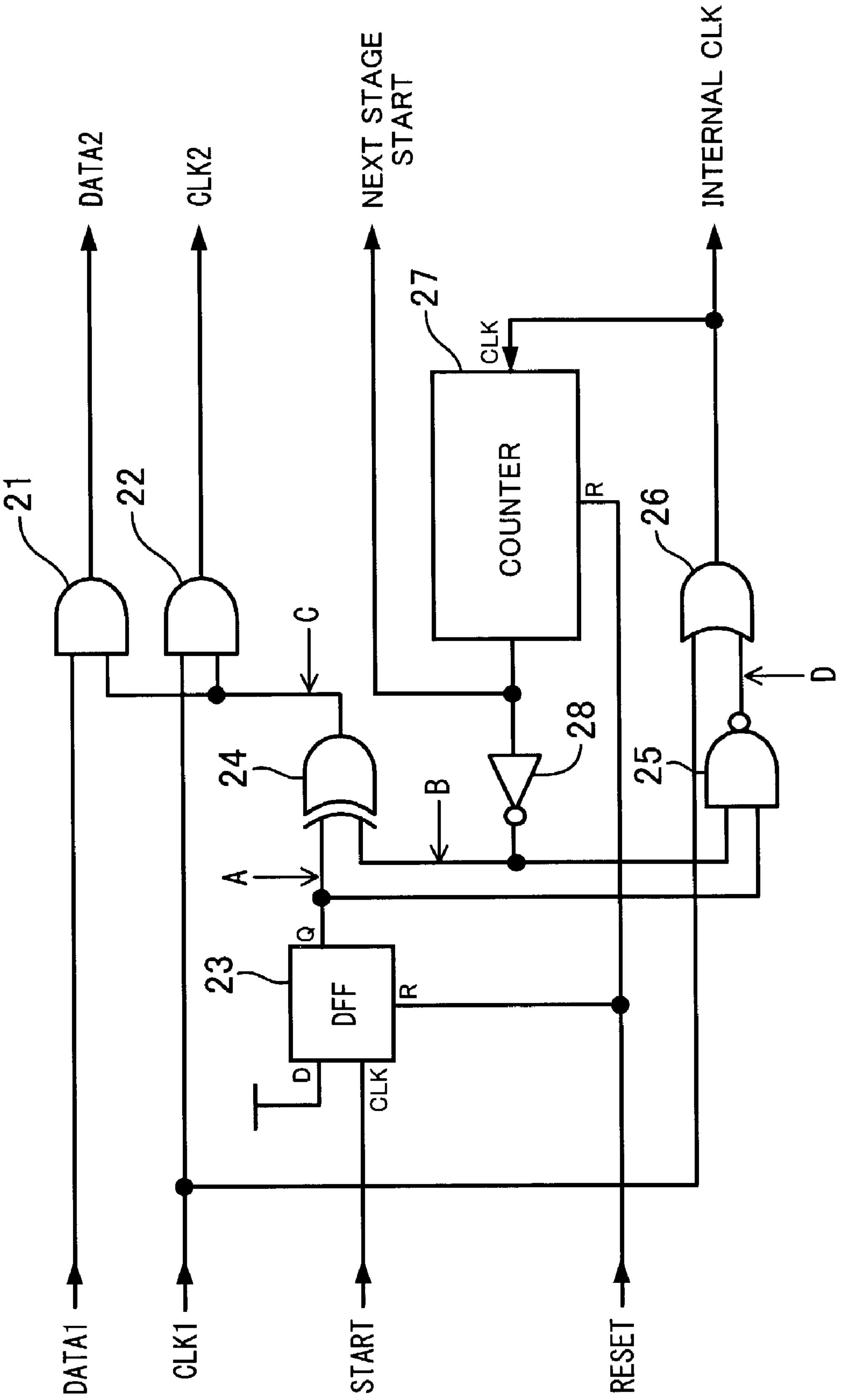
FIG. 3 is a circuit diagram of a structure of a data control circuit.
Figure 4:
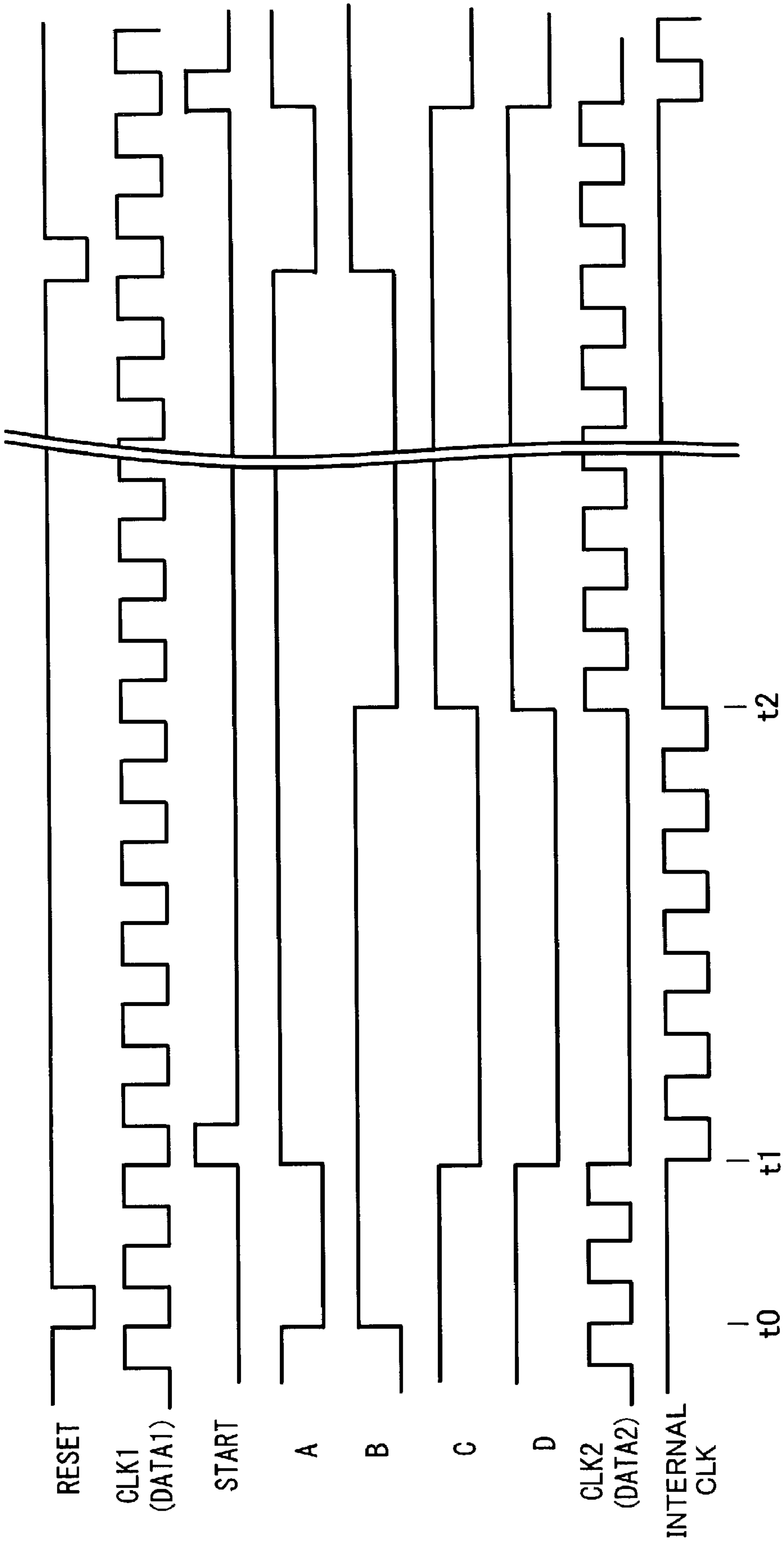
FIG. 4 is a waveform diagram of signals at nodes of the data control circuit.
Figure 5:
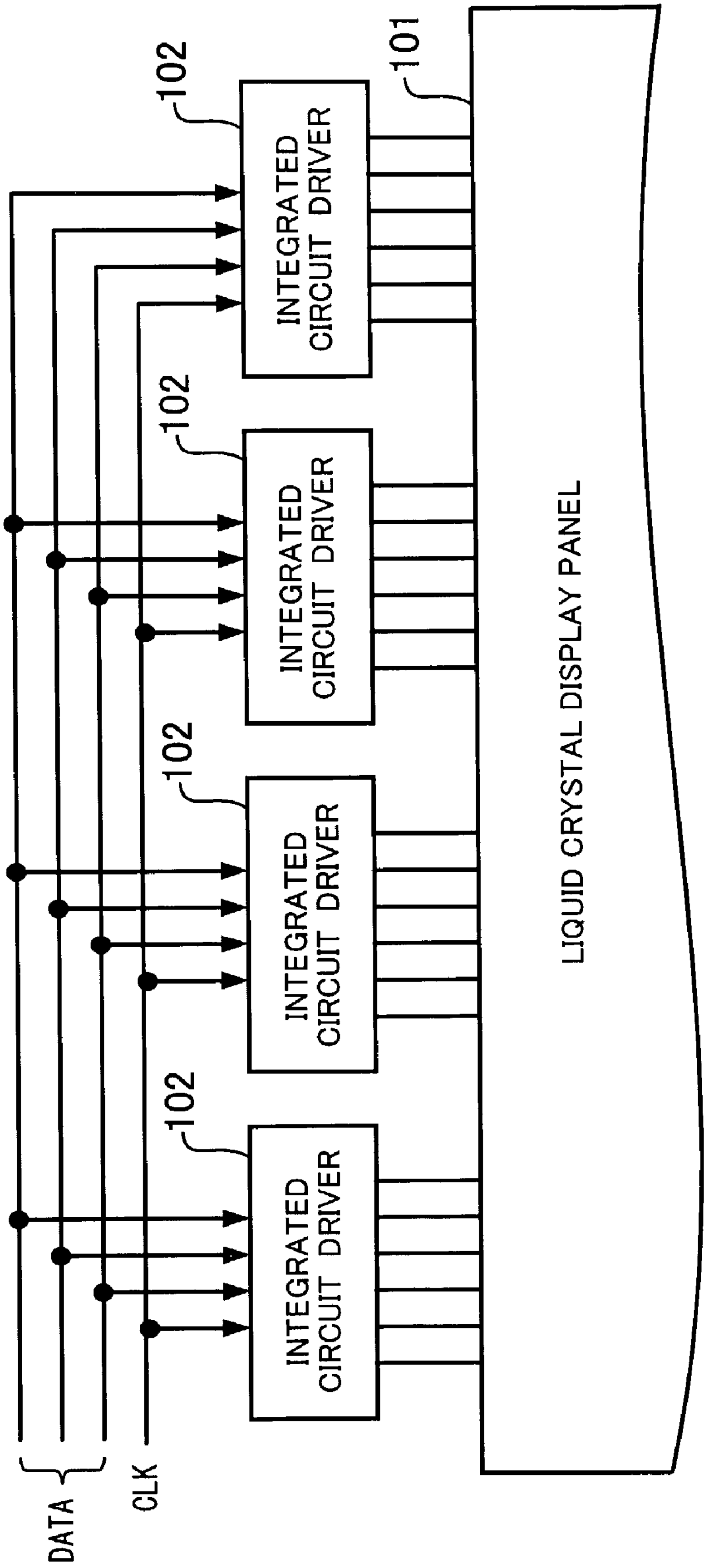
FIG. 5 PRIOR ART
FIG. 5 is a diagram of a conventional data driver.
Figure 6:
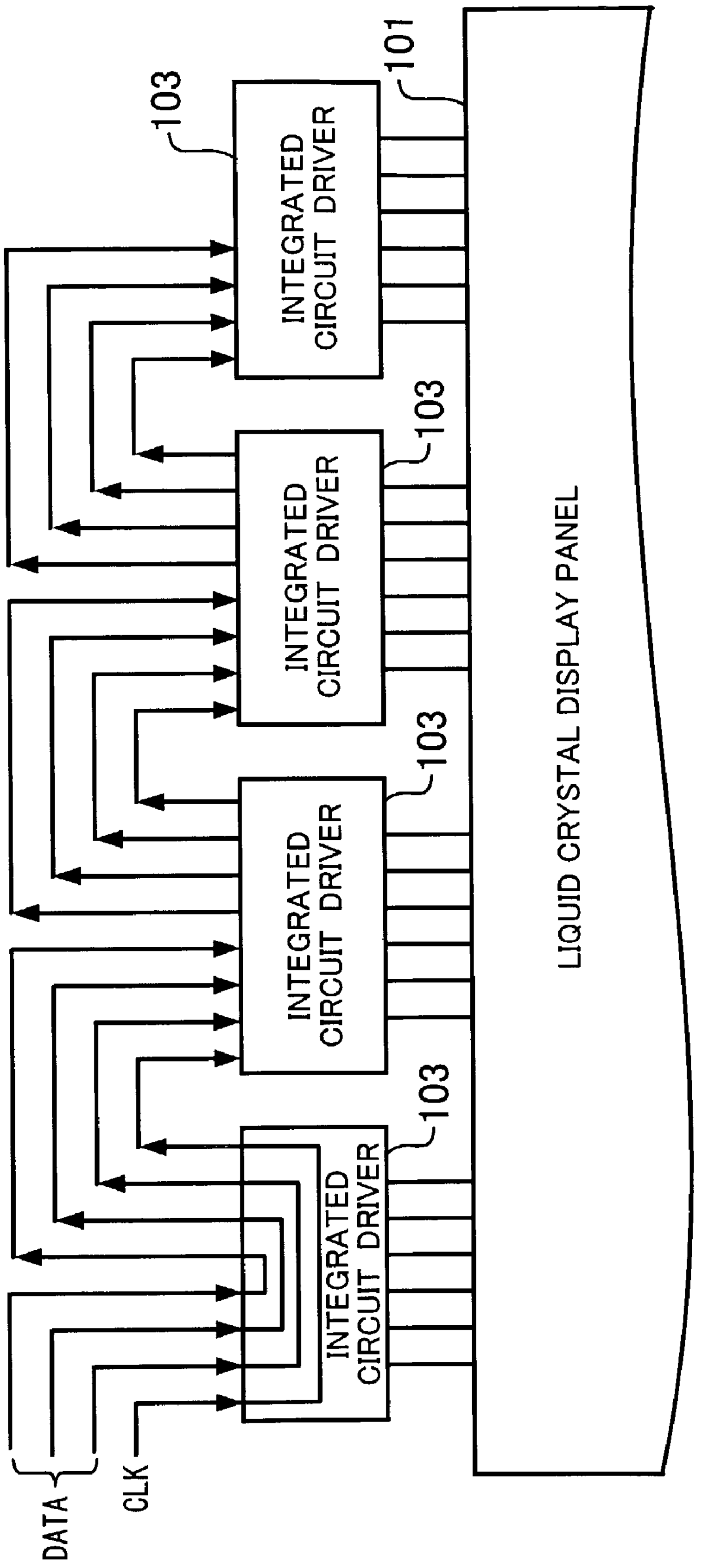
FIG. 6 PRIOR ART
FIG. 6 is a diagram of another conventional data driver.

FIG. 3 is a circuit diagram of a structure of the data control circuit, and FIG. 4 is a waveform diagram of signals at nodes of the data control circuit shown in FIG. 3.

The data control circuit 13 has input terminals via which a data signal DATA1 and a clock signal CLK1 are respectively received from the data capturing circuit 12, and input terminals via which a start signal START and a reset signal RESET are respectively received. The data control circuit 13 has output terminals via which a data signal DATA2 and a clock signal CLK2 are respectively transferred to the data output circuit 14, an output terminal via which the start signal is transferred to the driver of the next stage, and an output terminal via which the internal clock signal is supplied to the shift register circuit 16, the latch circuit 15 and the internal circuit.

The input terminal that receives the data signal DATA1 is connected to a first input of an AND gate, the output of which is connected to an output terminal via which the data signal DATA2 is transferred to the data output circuit 14. The input terminal that receives the clock signal CLK1 is connected to a first input of the AND gate 22, the output of which is connected to an output terminal via which the clock signal CLK2 is transferred. The input terminals that respectively receive the start signal START and the reset signal RESET are connected to the corresponding inputs of a D-type flip-flop 23. A data input of the D-type flip-flop 23 is connected to a power supply line, and the non-inverting output thereof is connected to the first inputs of an exclusive-OR gate 24 and a NAND gate 25. The output of the exclusive-OR gate 24 is connected to second inputs of the AND gates 21 and 22. The output of the NAND gate 25 is connected to a first input of an OR gate 26. A second input of the OR gate 26 is connected to the input terminal that receives the clock signal CLK1, and the output thereof is connected to the output terminal via which the internal clock is supplied and the clock input of a counter 27. The reset input of the counter 27 is connected to the input terminal that receives the reset signal RESET, and the output thereof is connected to the input of an inverter 28 and the output terminal via which the start signal is transferred to the driver of the next stage. The output of the inverter 28 is connected to second inputs of the exclusive-OR gate 24 and the NAND gate 25.

An operation of the data control circuit 13 thus configured will now be given with reference to FIG. 4, in which signal A appears at the output of the flip-flop 23, signal B appears at the output of the inverter 28, signal C appears at the output of the exclusive-OR gate 24, and signal D appears at the output of the NAND gate 25. The data signals DATA1 and DATA2 are latched when the clock signals CLK1 and CLK2 are enabled and are not latched when disabled. Therefore, the operations of the clock signals CLK1 and CLK2 are typically illustrated.

The data control circuit 13 receives the clock signal CLK1 in advance, and receives the reset signal REST at time t0, the flip-flop 23 and the counter 27 are cleared. Thus, the signal A that is the output of the flip-flop 23 switches to the low level, and the signal B, which is the inverted version of the output of the counter 27 switches to the high level. Thus, the signal C, which is the output of the exclusive-OR gate 24, switches to the high level, so that the AND gates 21 and 22 are opened. Thus, the signal D, which is the output of the NAND gate 25, is switched to the high level, so that the output of the OR gate 26, namely, the internal clock signal is fixed at the high level.

Thereafter, the start signal START is input at arbitrary time t1. Then, the flip-flop 23 latches the high level of the power supply, and switches its output to the high level. This state is maintained until the next reset signal RESET is input. The output of the flip-flop 23 is switched to the high level, and the signal C that is the output of the exclusive-OR gate 24 switches to the low level because the signal B that is the second input thereof is at the high level. Thus, the two AND gates 21 and 22 are closed. Thus, the data signal DATA1 and the clock signal CLK1 are blocked from being transferred to the data output circuit 14. The first input of the NAND gate 25 is supplied with the high level, and the second input thereof is supplied with the high level, so that the output D switches to the low level. Thus, the OR gate 26 is opened and the clock signal CLK1 is output as the internal clock signal. The internal clock signal is supplied to the counter 27 and is output to the shift register circuit 16, the latch circuit 15 and the internal circuit as a reference clock.

Due to supply of the internal clock signal, the data signal DATA1 serially transferred is sequentially captured in the latch circuit 15 and is converted into parallel data. The counter 27 counts the number of cycles of the internal clock signal, and counts the number of items of the data signal DATA1 latched in the latch circuit 15. The counter 27 is set so as to correspond to the number of items of data to be latched in the latch circuit 15. When the count value becomes equal to the numeral number thus set at time t2, the output signal of the counter 27 switches to the high level. This output signal is inverted by the inverter 28, and the resultant low-level signal B is output. This switches the output signal C of the exclusive-OR gate 24 to the high level, so that the two AND gates 21 and 22 are opened. Thus, the data signal DATA1 and the clock signal CLK1 can be transferred to the data output circuit 14. Since the second input of the NAND gate 25 switches to the low level, its output signal D switches to the high level. Thus, the OR gate 26 is closed so that its output can be fixed at the high level. The internal clock is no longer generated from the clock signal CLK1, and the counter 27, the shift register circuit 16, the latch circuit 15 and the internal circuit stop operating. Data cannot be transferred to the latch circuit 15, and power consumption can be reduced. The high-level signal generated when the counter 27 counts up is used to generate a pulse of the start signal applied to the driver of the next stage.

Each of the following drivers cascaded stops supplying the data signal and the clock signal to the driver of the next stage when its own driver captures the data signal, and stops operating after the data is completely captured, so that the data signal and the clock signal can be transferred to the driver of the next stage. When the one scanning operation is completed, the driver 11 of interest starts inputting the reset signal RESET again.

The data control circuit 13 in the embodiment of the present invention employs the exclusive-OR gate 24 and the NAND gate 25 to implement the gate control for the data signal and the clock signal. Alternatively, the gate control for the data signal and the clock signal may be implemented by the NAND gate and the exclusive-OR gate, respectively, or may be performed by a combination of other logical gates.

The counter 27 is used to set the timings for passage and blocking of the data signal and the clock signal, and may be replaced by a shift register for the same effects.

The above-mentioned embodiment of the present invention is directed to the individual drivers formed of integrated circuits for driving the liquid crystal display panel. However, the present invention is not limited to the above. For example, the present invention can be applied to integrated circuit drivers that drive a thin-model display device such as a plasma display panel or an organic electroluminescence (EL) display panel.

As described above, according to the present invention, there is provided the internal data transfer blocking circuit for blocking the data signal from being transferred to the latch circuit while the data capturing circuit is receiving the data signal that is not to be latched by the latch circuit. It is therefore possible to separate the data signal to be sent to the latch circuit and the data signal to be sent to the data output circuit for the next stage from each other. When the latch circuit finishes capturing the data necessary for its own, the internal data transfer blocking circuit blocks the data signal from being transferred to the internal circuit including the latch circuit. Thus, unnecessary operation can be avoided and power consumption can be reduced.

The foregoing is considered as illustrative only of the principles of the present invention. Further, since numerous modifications and changes will readily occur to those skilled in the art, it is not desired to limit the invention to the extract construction and applications shown and described, and accordingly, all suitable modifications and equivalents may be regarded as falling within the scope of the invention in the appended claims and their equivalents.

What is claimed is:

1. A liquid crystal display panel driver of a data cascading system in which a data signal is input and is cascaded to a next stage, comprising:

a data capturing circuit receiving a clock signal and a data signal from an outside of the display panel driver;

a data output circuit sending the clock signal and the data signal captured by the data capturing circuit to the outside;

a latch circuit latching the data signal captured by the data capturing circuit; and a logical gate circuit that outputs an internal clock signal to the latch circuit in response to the clock signal captured by the data capturing circuit during a period in which the data capturing circuit is receiving a part of the data signal that is intended for the latch circuit, and stops the internal clock signal during a period in which the data capturing circuit is receiving the other part of the data signal not for the latch circuit.

2. The liquid crystal display panel driver according to claim 1, further comprising a clock transfer blocking circuit that blocks the clock signal captured by the data capturing circuit from being transferred to the data output circuit while the data signal captured by the data capturing circuit is to be latched by the latch circuit.

3. The liquid crystal display panel driver according to claim 1, further comprising an external data transfer blocking circuit that blocks the clock signal captured by the data capturing circuit from being transferred to the data output circuit while the data signal captured by the data capturing circuit is to be latched by the latch circuit.

4. A semiconductor device capturing relevant data from a data signal that travels therethrough, comprising:

a data capturing circuit receiving a clock signal and a data signal from an outside of the semiconductor device;

a data output circuit sending the clock signal and the data signal captured by the data capturing circuit to the outside;

a latch circuit latching the data signal captured by the data capturing circuit; and a first logical gate circuit that outputs an internal clock signal to the latch circuit in response to the clock signal captured by the data capturing circuit during a period in which the data capturing circuit is receiving a part of the data signal that is intended for the latch circuit, and stops the internal clock signal during a period in which the data capturing circuit is receiving the other part of the data signal not for the latch circuit.

5. The semiconductor device according to claim 4, further comprising a counter that counts the number of cycles of the internal clock signal and thus counts the number of data signals to be latched, the first logical gate circuit being closed when the counter counts up.

6. The semiconductor device according to claim 5, further comprising an external data transfer blocking circuit that blocks the data signal captured by the data capturing circuit from being transferred to the data output circuit until the counter reaches a predetermined count value.

7. The semiconductor device according to claim 6, wherein the external data transfer blocking circuit includes a third logical gate circuit that receives the data signal captured by the data capturing circuit and outputs the data signal to the data output circuit, the third logical gate circuit being closed by the counter while the counter is counting.

8. The semiconductor device according to claim 5, further comprising a clock transfer blocking circuit that blocks the clock signal captured by the data capturing circuit from being transferred to the data output circuit until the counter reaches a predetermined count value.

9. The semiconductor device according to claim 8, wherein the clock transfer blocking circuit comprises a second logical gate circuit that receives the clock signal captured by the data capturing circuit and outputs the clock signal to the data output circuit, the second logical gate circuit being closed by the counter while the counter is counting.

* * * * *